Figure 1:
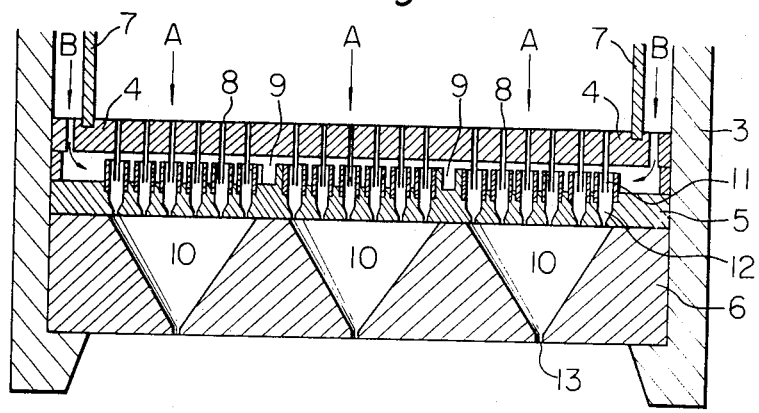

United States Patent [19]
Okamoto et al.

[11] 3,716,614
[45] Feb. 13, 1973

[54] PROCESS OF MANUFACTURING COLLAGEN FIBER-LIKE SYNTHETIC SUPERFINE FILAMENT BUNDLES

[75] Inventors: Miyoshi Okamoto, Takatsuki-shi, Osaka; Shunji Mizuguchi; Koji Watanabe, both of Otsu-shi, all of Japan

[73] Assignee: Toray Industries, Inc., Tokyo, Japan

[22] Filed: May 4, 1970

[21] Appl. No.: 34,458

[30] Foreign Application Priority Data

May 12, 1969 Japan.................................44/35780

[52] U.S. Cl.................264/344, 264/49, 264/171, 264/343, 425/131, 156/155, 156/296, 156/297
[51] Int. Cl..............................................B29c 25/00
[58] Field of Search.....................264/171–174, 49, 264/344; 161/171–177; 425/131, 133; 56/155, 296, 297

[56] References Cited

UNITED STATES PATENTS

| | | |
|---|---|---|
| 3,099,067 | 7/1963 | Merrian et al............................28/82 |
| 3,536,796 | 10/1970 | Rock......................................264/49 |
| 3,549,734 | 12/1970 | Yasuda et al........................264/344 |
| 3,551,538 | 12/1970 | Yamamoto et al.....................264/49 |
| 3,562,374 | 2/1971 | Okamoto et al...................264/210 I |
| 3,565,985 | 2/1971 | Schrenk et al........................264/171 |
| 3,577,308 | 5/1971 | Van Dranen et al.................161/176 |
| 3,613,173 | 10/1971 | Mafsui et al..........................264/171 |
| 2,932,079 | 4/1960 | Dietzsch et al.......................264/171 |
| 3,015,873 | 1/1962 | Dietzsch et al.......................264/171 |
| 3,369,057 | 2/1968 | Twilley.................................260/857 |
| 3,382,305 | 5/1968 | Breen....................................264/171 |
| 3,443,278 | 5/1969 | Nanta....................................264/171 |
| 3,447,308 | 6/1969 | Fontijin et al..........................57/140 |
| 3,475,898 | 11/1969 | Magat et al.............................57/140 |
| 3,485,912 | 12/1969 | Schrenk et al........................264/171 |
| 3,499,822 | 3/1970 | Rasmussen.......................260/897 A |
| 3,503,836 | 3/1970 | Rasmussen...........................264/291 |
| 3,505,162 | 4/1970 | Rasmussen...........................161/168 |
| 3,511,742 | 5/1970 | Rasmussen...........................264/171 |
| 3,531,368 | 9/1970 | Okamoto et al.....................264/171 |

*Primary Examiner*—Jay H. Woo
*Attorney*—Robert E. Burns and Emmanuel J. Lobato

[57] ABSTRACT

Collagen fiber-like synthetic superfine filament bundles are prepared through a process in which an "islands-in-a-sea" type composite filament is formed from a sea constituent polymeric material and an island constituent polymeric composition consisting of at least two polymers different from each other, at least one of which has a content of 7 to 93 percent based on the composition, the sea constituent is removed for obtaining a bundle of island constituent superfine filaments and then at least one polymer in the resultant superfine filaments is removed in order to obtain the collagen fiber-like synthetic superfine filament bundles.

10 Claims, 5 Drawing Figures

PATENTED FEB 13 1973 3,716,614

PROCESS OF MANUFACTURING COLLAGEN FIBER-LIKE SYNTHETIC SUPERFINE FILAMENT BUNDLES

The present invention relates to a process of manufacturing collagen fiber-like synthetic superfine filament bundles, particularly relates to a process of manufacturing collagen fiber-like synthetic superfine filament bundles from "islands-in-a-sea" type composite filaments containing a plurality of superfine filamentary constituents consisting of at least two polymeric materials blended with each other.

Natural leather is composed of numerous collagen fibers mutually intertwined in a three-dimensional condition. The collagen fibers in the natural leather, for example, cowhide, is composed of a bundle of a plurality of superfine fibers, each of the superfine fibers is composed of a bundle of a plurality of microfine fibers, each of the microfine fibers is composed of numerous fibrous units each of which is composed of several polypeptides located in parallel from each other, and each of the polypeptides is composed of three linear polymers of amino acids right hand-twisted with each other. Cross-sectional diameters of the collagen fibers are, for example, in cowhide, approximately 0.1 mm and in calfhide, approximately 0.02 mm.

Hitherto, synthetic fiber having a collagen fiber-like structure as stated above and a process of manufacturing the same are as yet not known.

Synthetic composite filaments made of two or more synthetic polymeric materials are well-known, for example, as indicated below:

1. blend-spun filament which is prepared by spinning a blended polymeric composition consisting of two or more synthetic polymeric material, the blend-spun filaments are classified into the following two classes,
    a. solution type, in which each componental polymeric material is dissolved in each other,
    b. dispersion type, in which at least one componental polymeric material (dispersed component) is dispersed in the other (matrix component),
2. composite filaments, in which two or more polymeric constituents are combined with each other, the composite filaments are classified as follows,
    a. side-by-side type, in which the constituents adhere to each other in a "side-by-side" relationship along the longitudinal axis of the filament,
    b. laminate-type, in which the constituents shaped in a tape form or flat form are mutually laminated,
    c. "core-in-sheath" type, in which at least one core constituent is embedded in a sheath constituent.

The term "islands-in-a-sea" type composite filaments as used herein refers to specific "core-in-sheath" type composite filaments which are composed of a plurality of superfine filamentary constituents (island constituents) and another filamentary constituent (sea constituent), the island constituents continuously extend independently from each other along the longitudinal axis of the filament in a superfine filament form and the sea constituent incorporates the island constituents into a filament body by filling spaces between the island constituents located apart from each other.

It is well-known that the dispersion type blend filaments are utilized for manufacturing porous filament by removing the dispersed component in the blend filaments so that only the matrix component remains.

Also, it is well-known that "islands-in-a-sea" type composite filaments are useful for preparing superfine filament bundles by removing the sea constituent so that only the superfine filamentary island constituents remain. However, the conventional porous filament prepared from the blend filament has by far the fineness larger than that of the superfine fiber in the collagen fiber owing to the inconveniences as indicated hereinafter. Also, the conventional superfine filament in the bundles prepared from the usual composite filament has by far the fineness larger than that of the microfine fiber in the collagen fiber and does not have the porosity as that of the collagen fiber. Consequently, the conventional synthetic fibers for manufacturing the synthetic leather are different from the natural collagen fiber in fineness, porosity and structure.

Generally, in the preparation of the usual dispersion type blend filament, it is required to strictly control the spinning condition in a limited range. Because the dispersing condition in which the dispersed component is dispersed in the matrix component in fine particle form, is very unstable, this causes breakage of filament during spinning. The dispersed component fine particles form microfibers which are dispersed in the matrix component through the spinning and drawing processes. Further, even if the spinning condition is strictly controlled in a desirable range, the resultant product does not always have satisfactory qualities. Furthermore, the blended polymeric materials result in the following disadvantages, 1. increase of apparent viscosity,
2. remarkable increase of Baras effect,
3. increase of draw resonance (periodical variation of fineness of spun filament), and
4. free draining of polymer liquid passed through the spinning orifice.

These undesirable phenomena cause difficulty of spinning and variation of the resultant product quality.

For spinning the blend filament at a favorable condition, it is effective that the dispersed component is uniformly dispersed into the matrix component in a microfine particle size. However, the dispersion type blend filament as stated above is useful for obtaining porous superfine filaments having a high moisture regain and a high softness even if the dispersed component is removed so that only the matrix component remains. Further, the removal of the dispersed component can be applied only to the dispersed component located on the outside portion of the filament, but not to the dispersed component completely embedded in the matrix component.

As indicated above, the "islands-in-a-sea" type composite filaments are useful for preparing the superfine filament bundle in which the superfine filaments are arranged in parallel to each other without any restriction between each other. In comparison with this, in the case of collagen filament, numerous superfine filaments form a bundle and are restricted from each other. Therefore, the collagen bundle of superfine fibers apparently behaves as a relatively thicker monofilament and can relax any external force acted upon the bundle by fibrilizing the bundle at a wide portion thereof for large external forces and at a narrow portion thereof for small external forces. However, the usual bundle of superfine filament from the conventional "islands-in-a-sea" type composite filament does not have the behavior as indicated above. The conventional superfine filament bundles are unsatisfactory for producing sheet material, for example, synthetic leather having a preferable rigidity, superior softness, high draping property and comfortable wearing property. That is, the conventional superfine filament had an unnecessary high softness, that is, very low Young's modulus and low rigidity and easily separated into numerous individual filaments. Further, the conventional superfine filament bundles used for producing synthetic leather cause difficulties for penetrating binder liquid into a sheet material to be formed into the synthetic leather during impregnation with the binder liquid.

Therefore, it is desirable that the superfine filaments are partially restricted from each other in the bundle in order to obtain a high rigidity and high permeability for the binder liquid.

An object of the present invention is to provide a process of manufacturing collagen fiber-like synthetic superfine filament bundles having a high moisture regain and a superior softness similar to those of the collagen fiber.

Another object of the present invention is to provide a process of manufacturing collagen fiber-like synthetic superfine filament bundles having a desirable rigidity.

Still another object of the present invention is to provide a process of manufacturing collagen fiber-like synthetic superfine filament bundles without inconvenience in spinning and drawing processes.

Still a further object of the present invention is to provide a process of manufacturing collagen fiber-like synthetic superfine filament bundles having easily processing and handling properties.

In the process of the present invention, firstly, an "islands-in-a-sea" type composite filament is prepared from a sea constituent polymeric material and an island constituent polymeric material in such a manner that the sea and island constituent polymeric materials are formed in a plurality of polymeric liquid streams, respectively, each of the island constituent streams being incorporated with one of the sea constituent streams into a composite stream, thereby a plurality of composite streams is formed and the composite streams are united into an "islands-in-a-sea" type composite stream by independently arranging the island constituent streams apart from each other and filling spaces between the island constituent streams with the sea constituent stream and the "islands-in-a-sea" type composite stream is spun into an "islands-in-a-sea" type composite filament through an orifice. The island constituent polymeric material is a blended polymeric composition consisting of at least two polymers different from each other and at least one polymer of the blended polymers has a content of 7 to 93 percent based on the weight of the composition. The spun composite filament is subjected to the conventional processes such as drawing, crimping, cutting, carding, lapping and needle-punching.

Secondly, the "islands-in-a-sea" type composite filament is subjected to the removal of the sea constituent. This step results in a bundle of island constituent superfine filaments.

Thirdly, the bundle is subjected to the removal of at least one component of the island constituent superfine filaments. In this step, the island constituent superfine filament is converted to a superfine porous filament or a bundle of microfibers.

As stated above, though at least one polymer in the island constituent stream is dispersed in another polymer in fine particle form, the spinning can be carried out at a favorable condition since the island constituent streams are spun together with the sea constituent stream in a condition embedded therewithin.

The spun "islands-in-a-sea" type composite filament can be subjected to drawing without inconvenience such as breakage of filament or undesirable winding on the drawing roller.

Figure 2:
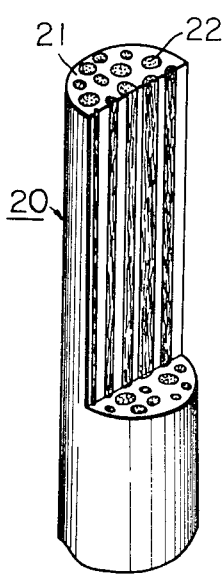
Figure 3:
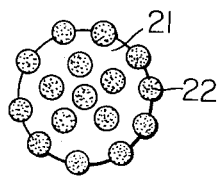
Figure 4:
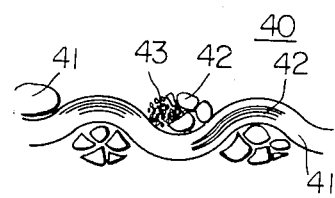
Figure 5:
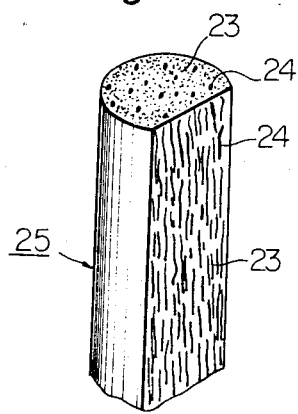

The features and advantages of the present invention will be illustrated with reference to the accompanying drawings in which;

FIG. 1 shows a cross-sectional view of an embodiment of the spinning apparatus for carrying out the process of the present invention, FIG. 2 shows a partially-sectional model view of an "islands-in-a-sea" type composite filament according to the present invention, FIG. 3 shows a cross-sectional profile of the "islands-in-a-sea" type composite filament, FIG. 4 shows a sectional model view of a natural leather being composed of mutually intertwined collagen fibers, and FIG. 5 shows a partially-sectional model view of a superfine filament consisting of dispersal component and matrix component according to the present invention.

The spinning process of the "islands-in-a-sea" type composite filament will be illustrated with reference to FIG. 1. In the drawing, three kinds of spinnerets 4, 5 and 6 are contained in a spinning apparatus 3 in combination. A partition 7 is usable for independently supplying the sea constituent polymer B and the island constituent polymeric composition A into the spinnerets 5 and 4, respectively.

The spinnerets 4 and 5 are provided with a plurality of orifices 11 and 12, respectively. The lower ends of the orifices 11 are inserted into the upper ends of the orifices 12. The sea constituent polymeric liquid B is supplied into the orifices 12 through passages 9, which are spaces between the lower end portions of the orifices 11 and the upper end portions of the orifices 12.

The island constituent polymeric liquid A passes into the orifices 11 through passages 8 connected with the orifices 11 and then is supplied into the orifices 12. Through contacting of the constituent polymer liquids A and B in the spinneret 5, both polymeric liquids A and B are incorporated into a composite stream in which the polymeric liquid B surrounds the polymeric liquid A in a "core-in-sheath" form.

The spinneret 6 is provided with a plurality of orifices 13 and funnel-shaped chamber 10. The upper ends of the chamber 10 are connected with the lower ends of the orifices 12 and the lower ends of the chamber 10 are connected to the orifices 13.

Numerous composite streams consisting of polymeric liquids A and B are fed into the funnel-shaped chamber 10 through the orifices 12 and united into "islands-in-a-sea" composite streams followed by extruding into "islands-in-a-sea" type composite filaments through the orifices 13.

The construction of the "islands-in-a-sea" type composite filament will be explained with reference to FIG. 2. In a composite filament 20 indicated in FIG. 2, numerous island constituents 22 are located in sea constituent 21 apart from each other. The island constituents 22 have a superfine filament form and continuously extend in parallel to each other along the longitudinal axis of the composite filament. The sea constituent 21 fills spaces between the island constituents so as to incorporate the island constituents into a filament body.

The island constituents may be perfectly embedded in the sea constituent as indicated in FIG. 2, or several island constituents may be exposed outside the sea constituent as indicated in FIG. 3.

FIG. 4 shows a model view of the collagen fibers. In FIG. 4, the natural leather 40 is composed of numerous collagen fibers 41 intertwined with each other. The collagen fiber 41 is composed of a plurality of superfine fibers 42. The superfine fiber 41 is composed of numerous microfine fibers 43. The microfine fiber 43 is composed of numerous fibrous units (which are not indicated in the drawing) consisting of several polypeptides located in parallel from each other.

The collagen fiber, the superfine fiber, the microfine fiber and the fibrous unit have cross-sectional diameters, as for example, as indicated in Table 1, respectively.

TABLE 1

| Fiber | Diameter in mm |
|---|---|
| Collagen fiber | $8 \times 10^2$ |
| Superfine fiber | $4 \times 10^3$ |
| Microfine fiber | $1 \times 10^4$ |
| Fibrous unit | $15 \times 10^{-7}$ |

FIG. 5 shows a model view of the superfine filament prepared from the "islands-in-a-sea" type composite filament according to the process of the present invention. In the superfine filament 25 indicated in FIG. 5, numerous dispersed components 24 are distributed at random in the matrix component 23 in a microfiber form. The dispersed component microfibers 24 extend substantially along the longitudinal axis of the superfine fiber 25 in a discontinuous condition. That is, the microfibers 24 are formed in a short length fiber form.

Generally, when the superfine filament is composed of 7 to approximately 35 percent (35 ± 5 percent) by weight of the dispersed microfiber components and approximately 65 percent (65 ± 5 percent) to 93 percent by weight of the matrix component, the dispersed microfiber components are distributed in the matrix component in a condition in which the microfiber components are substantially independent from each other. Therefore, if the dispersed microfiber components are removed, the result is a porous filament having numerous microfiber-formed pores substantially independent from each other and if the matrix component is removed, the result is a bundle of numerous microfibers substantially independent from each other.

Also, when the superfine filament is composed of more than approximately 35 percent (35 ± 5 percent) by weight of the dispersed microfiber components and less than approximately 65 percent (65 ± 5 percent) by weight of the matrix component, the dispersed microfiber components are distributed in the matrix component in a condition in which the microfiber components are substantially connected with each other, in general. Therefore, if the dispersed microfiber components are removed, the result is a porous filament having numerous microfiber-formed pores substantially connected with each other in a network condition, and if the matrix component is removed, the result is a bundle of numerous microfibers substantially connected with each other at a network condition.

The above-stated constructions of the superfine porous filaments or the microfiber bundles are merely illustrated as model forms, actually, there are numerous variations.

The constituent polymers usable for the process of the present invention may be selected from polyamides such as nylon 6, nylon 66, nylon 610, nylon 12, nylon 11, these copolymers and these mixtures, polyesters such as polyethylene terephthalate, polytetramethylene terephthalate, polytrimethylene terephthalate, polyethylene oxybenzoate, polyethylene sebacate, polyethylene adipate, these copolyesters and these mixtures, polyolefins such as polyethylene, polypropylene, these copolymer and these mixtures, polyethers such as polyethylene oxide, polymethylene oxide, polyethylene glycol and these mixtures, vinyl polymers such as polystyrene, polymethyl methacrylate, polyvinyl alcohol, polyacrylonitrile, these copolymers and these mixtures, polyurethane and its copolymer and these mixtures.

These constituent polymers may be selected in consideration of usage, cost and processability of the resultant synthetic superfine filament bundle and properties of the polymers themselves. Generally, the sea constituent polymers and the dispersed microfiber component polymers being contained in the island constituent, are preferably selected from easily removable polymers such as polyethylene oxide, polystyrene and polyvinyl alcohol. Polyethylene oxide and polyvinyl alcohol can be dissolved off into water and polystyrene into normal organic solvent such as tetrachloro methane, chloroform, trichloroethylene, tetrachloro ethylene, toluene, xylene and the like. Selection of solvent usable for the present invention is very important for efficiently dissolving off the sea constituent and/or the dispersed microfiber component polymer without degradation of the matrix component polymer.

The matrix component polymer in the island constituent may be selected, in general, from fiber forming polyamides, polyesters, polyolefins and acrylic polymers in consideration of desired performances of the proposed superfine porous bundle, kinds of sea constituent and dispersed microfiber component polymers used, its processability such as spinnability and drawing ability and usages of the bundle.

The sea constituent polymers may be chosen at will from polymers which can be spun and drawn together with the island constituent polymeric composition into the "islands-in-a-sea" type composite filament without difficulty. Since the sea constituent polymers are finally removed from the composite filament in order to form the superfine filament bundle, it is desired that the sea constituent polymers are easily removed by an inexpensive solvent. In consideration of this, it is desirable that the sea constituent polymers are chosen from polystyrene, polyethylene oxide and polyvinyl alcohol which have a solubility parameter ranged between from 0.4 to 0.5.

The sea constituent polymer may be the same as the dispersed component polymer or may be different. In the former case, the sea constituent and the dispersed microfiber component can be removed at the same time by a solvent. Therefore, the "islands-in-a-sea" type composite filament is converted into the superfine porous filament bundle by one solvent treatment.

The dispersed microfiber component polymer may be blended with the matrix component polymers at a condition and manner determined in consideration of dispersing property of the dispersed microfiber component polymer in the matrix component polymer. Preferably, both the dispersed microfiber and matrix component polymers are previously blended by a chip mixing manner, kneader mixing manner or extruder mixing manner, or mixing at the polymerization step. Also, these polymers may be blended at the melting step or spinning solution preparing step for spinning them. In the case of melt spinning, the chip mixing manner or extruder mixing manner is valuable for dispersing the dispersed microfiber component polymer in the matrix component polymer in a continuous microfibrous form with a suitable size. Particularly, the extruder mixing manner is valuable for uniformly dispersing. Also, the chip mixing manner is convenient due to its easy processing without the use of any special device.

In the case of wet spinning, the emulsion manner in which a component polymer solution is emulsified in another component polymer solution and the suspension manner in which a component polymer is uniformly suspended in another component polymer are used for mixing both the dispersed microfiber and matrix component polymers.

It is required that the content of the dispersed microfiber component in the island constituent is selected in a range between from 7 to 93 percent based on the weight of the island constituents.

When the content of the dispersed microfiber components is less than 7 percent, if the dispersed microfiber components are removed, the resultant porous filament has an insufficient porosity and thus undesirable low softness and low moisture regain, and if the matrix component having a content of more than 93 percent is removed, the resultant bundle of microfibers has a low weight, that is, a yield of the microfiber bundles is very unsatisfactory in consideration of commercial profit.

When the content of the dispersed microfiber components is more than 93 percent, the relation between the dispersed microfiber components and the matrix component may be intermingled and reversed, and if the dispersed microfiber components are removed, the residual porous filament has a very low weight unprofitable in consideration of commerce, and tends to be fibrilized or powdered, and if the matrix component is removed, the microfibers in the resultant bundle are so unnecessarily connected with each other, that this causes an undesirable low softness and low moisture regain. These cause difficulties in the preparation of uniform, continuous collagen fiber-like synthetic superfine filament bundles having a smooth surface and desirable high productivity in consideration of commercial profit.

The "islands-in-a-sea" type composite filament according to the present invention may have a cross-sectional profile selected at will, from circular, hollow, triangular and other irregular shapes. Also, the island constituents may be selected from the cross-sectional profiles as stated above at will.

Number of the island constituents to be contained in an "islands-in-a-sea" type composite filament may range between from 3 to 100. If the number of the island constituents is smaller than 3, it is difficult to prepare superfine filaments with high efficiency. Also, if the number is larger than 100, the resultant superfine filament has too low a fineness and thus, is unsuitable for practical uses.

The fineness of the synthetic superfine filament bundle of the present invention is in a range from 0.01 to 1.5 denier, basing upon the content ratio of the island constituent with respect to the sea constituent, number of island constituents and content of the matrix component in the island constituent. The porosity, softness and moisture regain of the resultant superfine filament bundle vary depending on the content of the dispersed microfiber component in the island constituent, distributing condition of the dispersed microfiber component and size of distributed dispersed component microfibers.

In the "islands-in-a-sea" type composite filament in accordance with the present invention, the content of the island constituent is in a range from 20 to 80 percent, preferably 40 to 70 percent based on a total weight of the composite filament.

The superfine filaments of the present invention are prepared in a bundle form. This is valuable in that undesirable hand feeling of the individual superfine filaments, which adhere on human skin, can be avoided and fuzz produced, due to separation of the individual superfine filaments from each other, can be prevented. The resultant superfine porous filament bundle has a desirable sheen, suitable moisture regain and proper softness due to the features of the superfine porous filament itself.

The present invention includes a novel improvement for the process of manufacturing superfine filament bundles having a collagen fiber bundle-like configuration. In this improved process, at least one special polymer, which can adhere the superfine filaments to each other, is contained in the island constituent. The adhesive polymer is activated through dissolving it in a solvent, swelling it in a swelling agent or heating it at a suitable temperature and may be selected at will. As solvent-active adhesive polymers, polyurethane type polymers are useful for the process. Usable heat-active adhesive polymers may be selected from polyesters having a relatively lower melting point, copolyamides, copolyesters and the like.

In order to efficiently utilize the adhesive component polymer, it is desirable that the adhesive component polymer is dispersed in the matrix component polymer so that a portion of the adhesive polymer is exposed at a periphery of the island constituents. However, even if the exposure of the adhesive polymer is partially sufficient or completely insufficient, the adhesive polymer can be moved to the periphery of the superfine filament by treating it with the solvent. In such case, the solvent treatment must be carried out at a severe condition.

Content of the adhesive polymer in the island constituent is preferably in a range from 7 to 85 percent, more preferably 10 to 60 percent. If the content is less than 7 percent, the adhering effect of the adhesive polymer is insufficient and if larger than 85 percent, the productivity of the superfine porous filaments or the microfiber bundles is very poor, and the resultant superfine porous filaments or microfiber bundles are substantially completely adhered with each other. This results in the disappearing of the advantages of the superfine porous filaments or microfiber bundles. However, the superfine filament containing 60 to 85 percent adhesive polymer is usable as an adhesive filament which is mixed with other nonadhesive filaments for mutually fixing the nonadhesive filaments.

The present invention is further illustrated by the following examples which are given for illustrative purposes only.

EXAMPLE 1

An "islands-in-a-sea" type composite filament was prepared from the following polymeric materials using the spinning apparatus indicated in FIG. 1.
1. Sea constituent polymer: Polystyrene
2. Island constituent polymeric composition: A blended polymeric composition consisting of a matrix component which consists of polyethylene terephthalate having an intrinsic viscosity $[\eta]$ of 0.76 determined in $\theta$ chlorophenol at a temperature of 20°C and 0.1 percent of titanium dioxide based on the weight of the polyethylene terephthalate, and a dispersed microfiber component of 15 percent polyethylene oxide based on the weight of the matrix component. The matrix component and the dispersed microfiber components were previously blended with each other by a chip blend manner.

The polymeric materials were spun at a temperature of 285°C and a take-up velocity of 1,000 m/min into the "islands-in-a-sea" type composite filament in which 15 superfine filamentary island constituents were contained and content ratio of the sea constituent with respect to the island constituents was 50 : 50. The spun composite filament was drawn at a draw ratio of 2.8 by using a heating pin heated at a temperature of 87°C and a heating plate heated at a temperature of 130°C.

The drawn filament was treated in toluene at room temperature to dissolve the polystyrene sea constituent. A bundle of superfine blend filaments were obtained. The resultant superfine blend filaments were very soft and had a favorable silky sheen. The superfine blend filament bundle was treated in trichloroethylene at room temperature for a time enough to dissolve the polyethylene oxide dispersed microfiber component. Through this treatment, the bundle had a weight loss of approximately 15%. This demonstrated that the dispersed microfiber component was substantially entirely dissolved off from the blend filament bundle.

Through microscopic observation, it was demonstrated that the residual superfine filament had numerous linear pores formed at random along the longitudinal axis of the filament.

The individual superfine porous filament had a fineness of 0.09 denier. As a comparison, the above-stated procedure was repeated except that the island constituent did not contain the polyethylene oxide dispersed microfiber component and the treatment in trichloroethylene was not carried out, so that a final bundle of superfine filaments each having a fineness of 0.09 denier was obtained.

The superfine porous filament of the present Example and the comparison superfine filament had the properties as indicated in Table 2.

TABLE 2

| | Filament of the Present Example | | |
|---|---|---|---|
| | Before treating in trichloroethylene | After treating in trichloroethylene | Comparison filament |
| Moisture regain | 2.4% | 2.1% | 0.7% |
| Tenacity | 5.7 g/d | 5.9 g/d | 6.1 g/d |
| Elongation | 35.6% | 28.7% | 34.3% |
| Draping property | 0.7 cm | 0.5 cm | 0.8 cm |

Note:
(1) Moisture regain is determined in accordance with JIS L–1073.
(2) Draping property is determined in accordance with JIS L–1079, method A.

In consideration of Table 1, the filament of the present Example had, before treating in trichloroethylene, a high moisture regain due to the presence of polyethylene oxide having a high moisture regain property and the comparison filament had a low moisture regain due to absence of polyethylene oxide. However, after treatment in trichloroethylene, although the resultant porous filament did not contain polyethylene oxide effective for increasing the moisture regain degree, the resultant porous filament had a moisture regain approximately similar to that of the filament containing polyethylene oxide. Such high moisture regain of the filament of the present Example is due to its high porous constitution. Also, the superfine porous filament of the present Example had a favorable draping property.

Examples 2 to 5

Four "islands-in-a-sea" type composite filaments were prepared in the same manner as that of Example 1 from the following polymeric materials.
1. Sea constituent polymer: Styrene-methyl methacrylate copolymer in common for the four composite filaments.
2. Island constituent polymeric composition: A blended polymeric composition consisting of a matrix component which consists of nylon 6 having a relatively viscosity $[\eta_r]$ of 3.2 determined in 1 percent aqueous solution of 98 percent sulfuric acid at a temperature of 25°C and a dispersal component of 10 percent (Example 2), 30 percent (Example 3), 50 percent (Example 4) and 60 percent (Example 5) of the same styrene-methyl methacrylate copolymer as the matrix component based on the weight of the matrix component.

The resultant "islands-in-a-sea" type composite filaments were treated in trichloroethylene for dissolving the styrene-methyl methacrylate copolymer sea constituent and dispersed microfiber component. The resultant superfine porous filament bundles were further rinsed by fresh trichloroethylene and then dried.

The bundles of Examples 2 and 3, which were resultant from the composite filaments containing 10 and 30 percent of styrenemethyl methacrylate copolymer dispersed microfiber component, respectively, and consisted of stable superfine porous filaments. In the case of the bundle of Example 4 which resulted from the composite filament containing the island constituent containing 50 percent of the copolymer dispersed microfiber component, some portions of resultant superfine porous filaments were partially fibrilized or powdered. Also, in the case of the bundle of Example 5, which resulted from the composite filament containing 60 percent copolymer dispersed microfiber component based on the weight of the matrix component, the resultant filaments were broken due to partially powdering thereof.

EXAMPLE 6

The procedure of Example 2 was repeated except that the island constituent consisted of a composition consisting of nylon 6 matrix component having a relative viscosity $[\eta_r]$ of 3.2 and 16.7 percent of polyethylene oxide dispersed microfiber component based on the weight of the matrix component and the content ratio of the sea constituent with respect to the island constituent was 40 : 60 by weight.

For comparison, the procedure stated above was repeated except that the island constituent composition did not contain polyethylene oxide and the content ratio of the sea constituent with respect to the island constituent was 50 : 50 by weight. The resultant and comparison "islands-in-a-sea" composite filaments were subjected to crimping mechanically at a crimp number of 17 crimps/inch, cutting at a length of 49 mm. The resultant staple fibers of the present Example were formed in a cloth lap and then needle-punched in order to form a felt material. The felt material was treated with an aqueous solution containing polyvinyl alcohol, impregnated with a solution containing 20 percent by weight of polyurethane in dimethyl formamide (DMF) immersed in water in order to coagulate the polyurethane, and then dried. The treated felt material was immersed in trichloroethylene for 24 hours for dissolving off the sea constituent, sufficiently rinsed in water at a temperature of 40°C for substantially completely removing polyvinyl alcohol impregnated in the felt material and polyethylene oxide in the island constituent. A leather-like sheet material was obtained. In a cross-sectional view of the resultant leather-like sheet material, it was illustrated that numerous bundles being composed of superfine porous filaments were combined by the polyurethane binder. The resultant leather-like sheet material had a favorable soft hand feeling and a high moisture regain.

Also, the comparison staple fibers were subjected to the above-stated proceedings and a comparison leather-like sheet material was obtained. The softness of the comparison sheet material was unsatisfactory, the superfine filaments in the sheet material were not porous and had an unsatisfactory moisture regain.

EXAMPLES 7 to 11

The procedure of Example 1 was repeated six times for preparing six "islands-in-a-sea" type composite filaments except that the island constituent consisted of a matrix component consisting of a copolymer of 85 percent by weight of nylon 6 and 15 percent by weight of nylon 66 and a dispersed component consisting of 0 percent (Example 7), 7 percent (Example 8), 10 percent (Example 9), 25 percent (Example 10) or 50 percent (Example 11) of polyurethane based on the weight of the matrix component. The spinning was carried out at a temperature of 240°C through an orifice having a diameter of 0.7 mm, the spun filaments were drawn at a draw ratio of 2.1 by using a heating pin maintained at a temperature of 80°C, the resultant composite filaments had a fineness of 3.5 denier and contained 16 island constituents.

The polyurethane was previously blended with the nylon 6-nylon 66 copolymer in a chip blending manner. Each of the superfine island constituents in the composite filament had a fineness of 0.12 denier.

The filaments of Examples 7, 8 and 9 were spun and drawn at a favorable condition, the filament of Example 10 was sometimes broken during spinning but drawn at a favorable condition and the filament of Example 11 was frequently broken during spinning and drawing.

The obtained composite filaments were crimped at a crimp number of 10 crimps/inch and cut at a length of 51 mm. The staple fibers of every Example were formed into webs by a cross lapper and the webs were needle-punched in such a condition that size number of the needle was 40, depth of needling was 13 mm and needle density was 500 needles/cm² in order to form felt materials.

Every resultant felt material was treated in tetrachloromethane for dissolving the polystyrene sea constituent and converted into very soft felt material being composed of such superfine fibers that the fibers had a tendency to adhere to human skin.

On the surfaces of the resultant superfine filaments, very thin polystyrene films were formed, but these films were removed by rubbing.

The resultant felt materials were immersed in dimethyl formamide for a short time, squeezed out and then pressed by a heating roll heated at a temperature of 160°C under a semidried condition.

The superfine filaments were adhered to each other by the polyurethane dissolved in dimethyl formamide.

The densities, carding and punching properties of the resultant felt materials are indicated in Table 3.

TABLE 3

| Example | Carding property [1] | Number of broken needles [2] | Density of felt material | | After pressing | Adhering property for filaments |
|---|---|---|---|---|---|---|
| | | | Before dissolving polyurethane | After dissolving polyurethane | | |
| 7 | Good | 5 | 0.094 | 0.302 | 0.310 | Poor. |
| 8 | do | 0 | 0.095 | 0.313 | 0.341 | Slightly good. |
| 9 | do | 3 | 0.093 | 0.300 | 0.374 | Good. |
| 10 | do | 2 | 0.091 | 0.301 | 0.384 | Do. |
| 11 | do | 27 | 0.089 | 0.296 | 0.401 | Do. |

[1] Test for carding property. The drawn and cut composite filaments were subjected to 50 times of a hand carding text or one time of practical carding and formed into a web. Processability of the carding was estimated.
[2] Test for needle punched property. A web prepared from the cut composite filaments was subjected to needle punching with 500 needles at a needling condition of 100 to 1,000 needles/cm.² Number of broken needles during the punching process was estimated.

In the felt material of Example 7, which is prepared from the composite filament not containing polyurethane, the resultant superfine filaments were adhered with each other. In the felt materials of Examples 8 to 11, the resultant superfine filaments were adhered with each other by polyurethane dissolved in dimethyl formamide.

EXAMPLE 12

An "islands-in-a-sea" type composite filament was prepared from the following polymeric materials.

1. Sea constituent: A polymeric composition consisting of polystyrene and 3 percent polyethylene glycol based on the weight of the polystyrene, which were previously blended with each other by the chip blending manner.
2. Island constituent: A polymeric composition consisting of polyethylene terephthalate and 15 percent nylon 6 based on the weight of the polyethylene terephthalate.

These polymeric materials were spun at a content ratio of the island constituent with respect to the sea constituent of 60 : 40 into an "islands-in-a-sea" type composite filament containing 30 superfine filamentary island constituents.

The resultant composite filaments had a fineness of 4.8 denier. After the sea constituent was dissolving by dimethyl formamide, the composite filaments were converted into bundles of 30 superfine filaments, each having a fineness of 0.1 denier.

The felt-forming procedure of Example 7 was repeated utilizing the composite filaments. The resultant felt material was treated in dimethyl formamide for dissolving the sea constituent, rinsed in fresh dimethyl formamide and then dried. The resultant felt material was composed of bundles of superfine fibers and was very soft. The superfine filaments had an adhering property which caused it to cling to human skin.

The resultant felt material was treated in a 95 percent aqueous solution of formic acid at a temperature of 80°C for 5 minutes to dissolve the nylon 6 in the island constituents and then in water for removing formic acid while pressing.

The resultant felt material was dyed in an aqueous solution containing 4 percent Cibalan Black 2BL (metallized acid dye, made by Ciba, Switzerland) and 3% $(NH_4)_2SO_4$ based on the weight of the felt material at a liquor ratio of 1 : 80 at a temperature of 95° to 99°C for 60 minutes.

In observation of the dyed felt material, it was demonstrated that residual nylon 6, which was dyed black partially adhered with the superfine filaments.

The felt material was converted into a leather-like sheet material.

What we claim is:

1. A process of manufacturing a collagen fiber-like bundle composed of synthetic superfine porous filaments and having a denier of 0.01 to 1.5 comprising,
    1. providing an island-in-a-sea type composite filament in which a) a plurality of independent superfine filamentary island constituents continuously extend along the length of said composite filament, and (b) a sea constituent incorporates said island constituents, wherein said island constituents (a) comprise a blended synthetic organic polymer composition consisting of (i) 7 to 93 percent by weight of said island component of a first synthetic organic fiber-forming polymer selected from the group consisting of polyamides, polyesters, and polyolefins for forming a matrix component and (ii) 7 to 93 percent by weight of said island constituent of a second synthetic organic polymer selected from the group consisting of polyesters, polystyrene, polymethyl methacrylate and polyvinyl alcohol and mixtures thereof and having a different solvent solubility from said matrix component polymer, said second polymer forming numerous micro-fiber components dispersed at random in said matrix component; and said sea constituent (b) being a synthetic organic polymer selected from the group of polystyrene, polymethyl methacrylate, polythers, and polyvinyl alcohol and being different in solvent solubility from any one of said matrix and micro-fiber component polymers;
    2. selectively first removing by a specific solvent therefore said sea constituent (b) from said island-in-the-seat composite filament and leaving a bundle of island constituent (a) superfine filaments; and
    3. selectively secondly removing by a specific solvent therefore either said matrix component (i) or at least one of said dispersed micro-fiber components (ii) from said island constituent superfine filaments, whereby said island constituent superfine filaments are converted into a collagen fiber-like bundle of superfine filaments with microfiber-shaped linear pore extending along said length of said superfine filament.

2. A process as claimed in claim 1, wherein said sea constituent polymer (b) is the same as said dispersed microfiber component polymer (ii), and both said sea constituent and dispersed microfiber components are selectively removed by a specific solvent for said same polymer from said islands-in-the-sea type composite filament at the same time.

3. A process as claimed in claim 1, wherein at least one component polymer contained in said island constituent is an adhesive synthetic organic polymer selected from the group of polyurethanes, polyamides, and polyesters effective for adhering said resultant collagen fiber-like superfine filaments with each other and is present in an amount of 7–85 percent by weight of said island constituent.

4. A process as claimed in claim 1, wherein said first removal of fibers is carried out by dissolving said sea constituent polymer with a solvent for said sea constituent polymer.

5. A process as claimed in claim 3, wherein said second removal of said adhesive polymer is carried out incompletely so that a portion of said adhesive polymer remains in order to partially adhere said resultant collagen fiber-like superfine filaments to each other by said residual adhesive polymer.

6. A process as claimed in claim 5, wherein said adhesive polymer is activated by being dissolved in an organic solvent for said adhesive polymer.

7. A process as claimed in claim 5, wherein said adhesive polymer is activated by being swollen with an organic swelling agent for said adhesive polymer.

8. A process as claimed in claim 5, wherein said adhesive polymer is activated by being heated to a proper temperature for said adhesive polymer.

9. A process as claimed in claim 1, wherein said matrix component and said dispersed microfiber component have contents of 7 to approximately 35 percent and approximately 65 to 93 percent based on the weight of said island constituent, respectively.

10. A process as claimed in claim 1, wherein said matrix component and said dispersed microfiber component have contents of approximately 60 to 93 percent and 7 to approximately 35 percent based on the weight of said island constituent, respectively.

* * * * *